(12) United States Patent
Markert et al.

(10) Patent No.: US 10,047,893 B2
(45) Date of Patent: Aug. 14, 2018

(54) IN-SITU PIPE CARRIER

(71) Applicant: Kiewit Infrastructure West Co., Omaha, NE (US)

(72) Inventors: David Markert, Surprise, AZ (US); Cole Kratochvil, Chandler, AZ (US); David Corrie, Queen Creek, AZ (US); Colby Elmore, Sun City, AZ (US); Thomas Polk, Maricopa, AZ (US); Jacob Sinclair, Maricopa, AZ (US); Kelly Sinclair, Mesa, AZ (US)

(*) Notice: Subject to any disclaimer, the term of this patent is extended or adjusted under 35 U.S.C. 154(b) by 0 days.

(21) Appl. No.: 15/347,667

(22) Filed: Nov. 9, 2016

(65) Prior Publication Data

US 2018/0017202 A1    Jan. 18, 2018

Related U.S. Application Data

(60) Provisional application No. 62/363,203, filed on Jul. 15, 2016.

(51) Int. Cl.
*F16L 55/18*    (2006.01)
*F16L 55/165*   (2006.01)
*B62D 65/02*    (2006.01)

(52) U.S. Cl.
CPC .......... *F16L 55/1657* (2013.01); *B62D 65/02* (2013.01)

(58) Field of Classification Search
CPC ...... F16L 55/18; F16L 55/26; E03F 2003/065
See application file for complete search history.

(56) References Cited

U.S. PATENT DOCUMENTS

| 1,195,147 | A | * | 8/1916 | Mitchell | B05B 13/0235 |
|           |   |   |        |          | 269/17       |
| 5,129,761 | A | * | 7/1992 | Andersen | F16L 1/036   |
|           |   |   |        |          | 405/134      |
| 2015/0330532 | A1 | * | 11/2015 | Vines | H02G 1/088 |
|           |   |   |        |          | 414/745.4    |

* cited by examiner

*Primary Examiner* — Kyle Armstrong
(74) *Attorney, Agent, or Firm* — Philip P. Mann; Mark R. Hennings

(57) ABSTRACT

A pipe carrier in an embodiment includes a pipe-carrying region in which forward and rear pipe lifting assemblies are arranged to lift and carry a pipe section. For example, the pipe-carrying region lies rearwards of the front traveling support of the pipe carrier, and forwards of the rear traveling support of the pipe carrier. The pipe carrier includes a modular extension assembly carrying an energy source for powering the pipe carrier, wherein the energy source is at least partially carried within the pipe-carrying region.

20 Claims, 9 Drawing Sheets

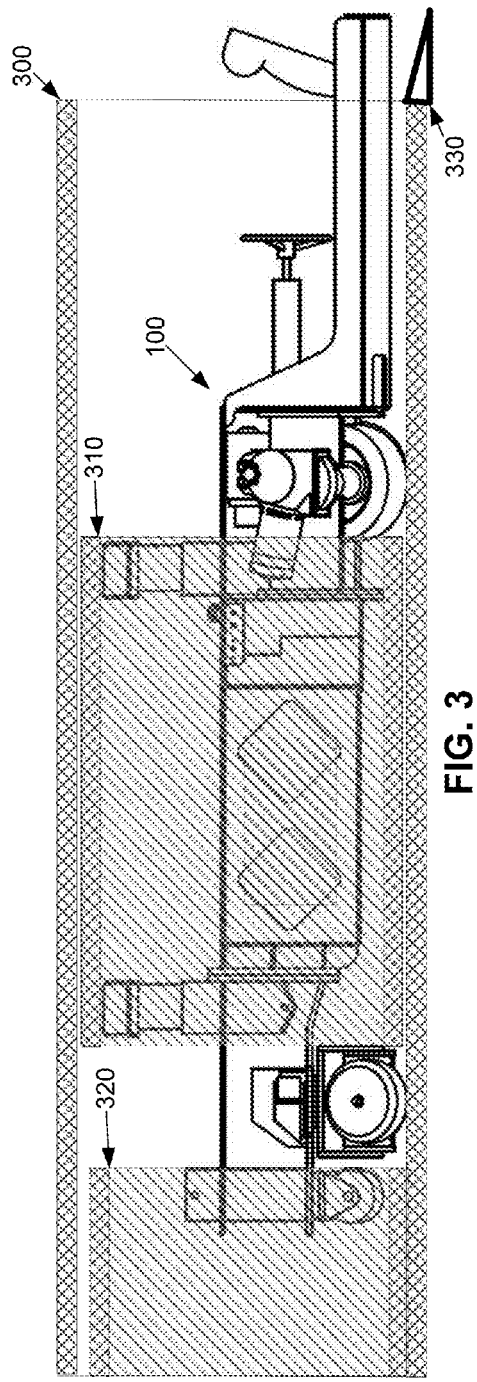
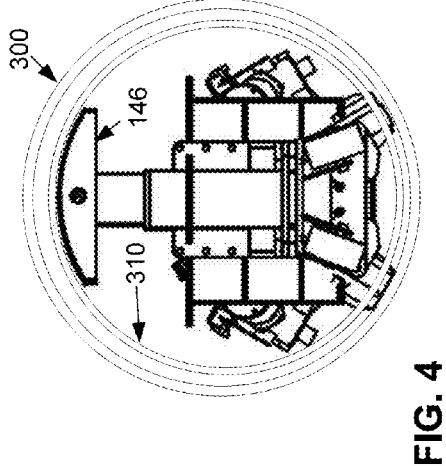
FIG. 4
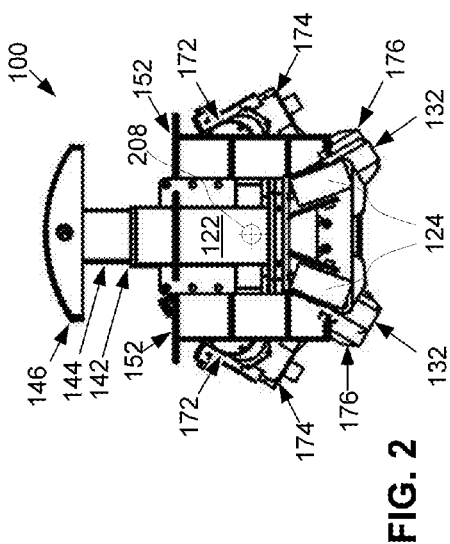
FIG. 2

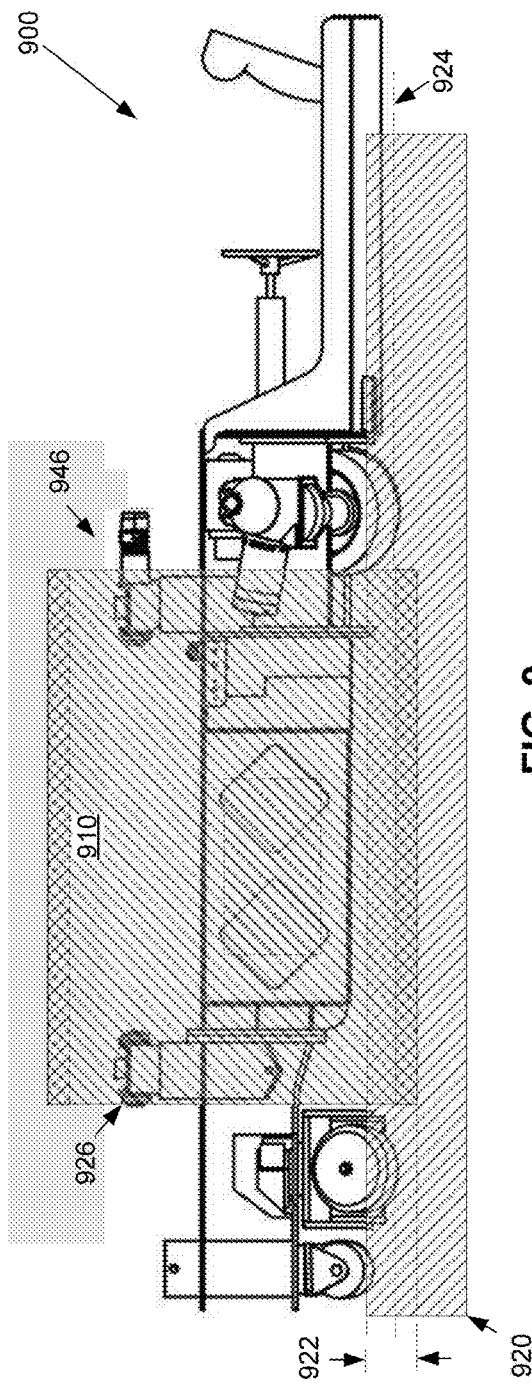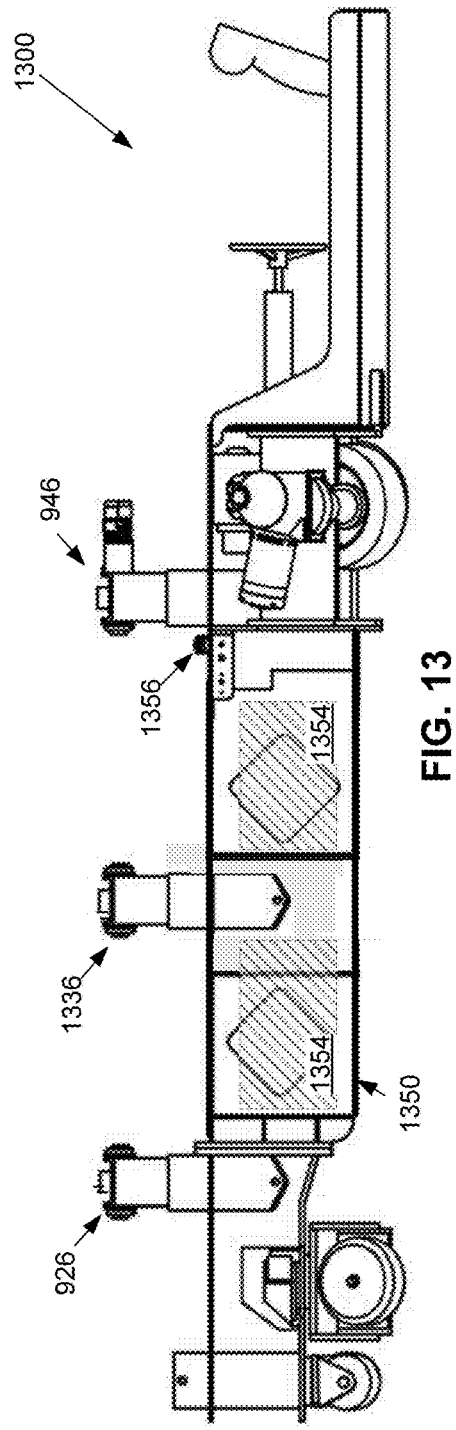

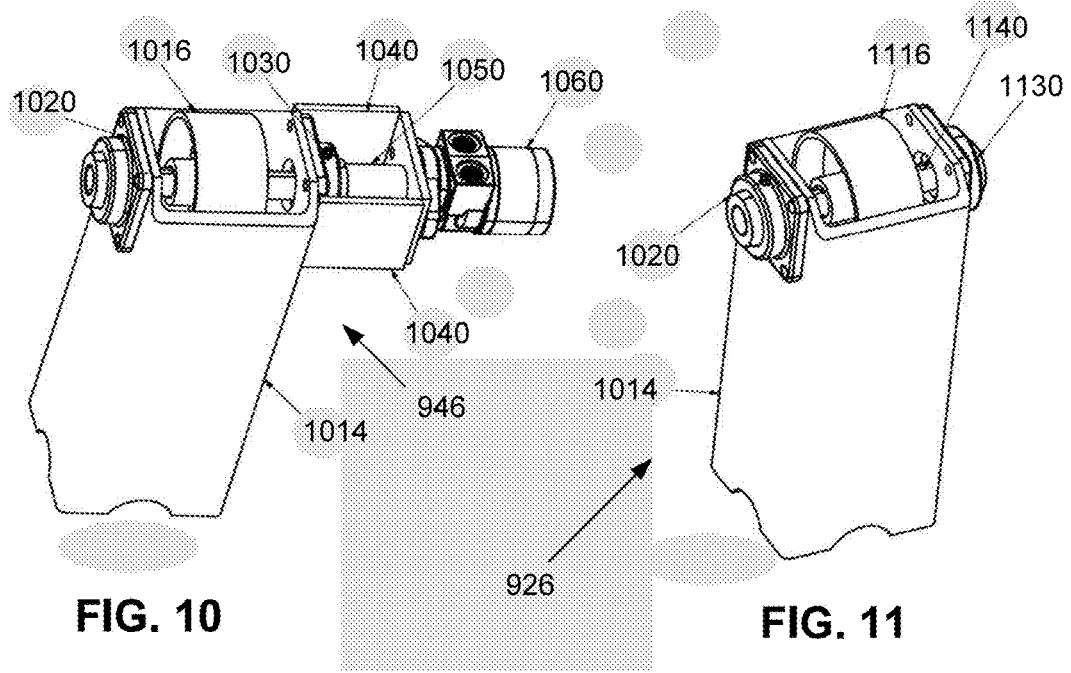
FIG. 10
FIG. 11
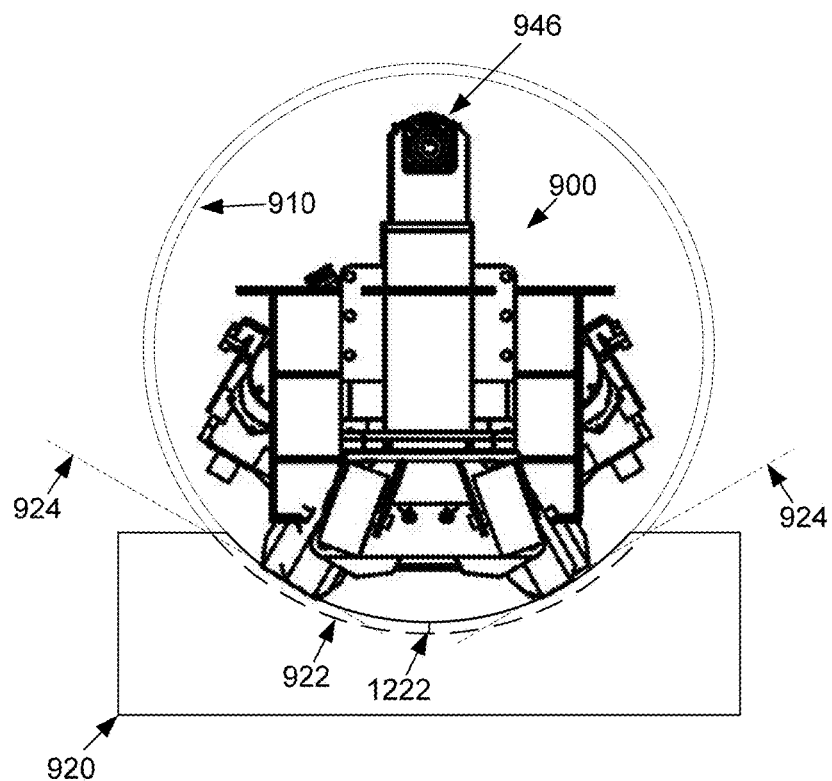
FIG. 12

IN-SITU PIPE CARRIER

CLAIM OF PRIORITY

This application claims the benefit of the priority of the provisional patent application 62/363,203 filed in the United States Patent and Trademark Office on Jul. 15, 2016, which is hereby incorporated by reference.

BACKGROUND

Pipes are structures often used as a conduit to convey (including to store or maintain) fluids such as water, fuel, air, and the like. Often, pipes (e.g., pipelines) are formed by using relatively short (e.g., small enough to be carried) pipe sections (e.g., which are cylindrically shaped and are often referred to as "cans"), where pipe sections are abutted end-to-end to form a conductive pipe longer than an individual pipe section. The pipes form a physical barrier for substantially reducing exfiltration of a fluid carried by the pipe and/or for substantially reducing infiltration of fluids and other substances surrounding the pipe. Often the pipes are laid in tunnels and/or trenches that are backfilled (and which subsequently might have structures built close by or even thereupon) such that inspection, maintenance, repair, and replacement of the pipe sections installed (e.g., buried) in such locations is difficult or even hazardous.

Materials (such as wood, concrete, metals, and the like) used to construct a pipe can gradually lose integrity over time. Pipes in use today (some of which have been in use over a hundred years) are subject to loss of integrity due to erosion, decomposition, forces such as pressure and torque, oxidation, acidity and the like. The loss of integrity can lead to outcomes such as fluid carried by the pipe is lost to the environment surrounding the pipe and/or substances in or around the pipe can contaminate the fluid carried by the pipe. Because of the numerous locations of the pipes (which often require inspection), opportunities for excavation and the available space to access the pipe for inspection (including various sections of the pipe) are often greatly limited.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

An in-situ pipe carrier in an embodiment includes a pipe-carrying region in which forward and rear pipe lifting assemblies are arranged to lift and carry a pipe section. For example, the pipe-carrying region lies rearwards of a front traveling support of the pipe carrier, and forwards of a rear traveling support of the pipe carrier. The pipe carrier includes a modular extension assembly for carrying an energy source for powering the pipe carrier, wherein the energy source is at least partially carried within the pipe-carrying region.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. The disclosure herein is, therefore, not to be taken in a limiting sense.

BRIEF DESCRIPTION OF THE FIGURES

FIG. 2 is an end view illustrating the in-situ pipe carrier 100 in accordance with embodiments of the present disclosure.

FIG. 3 is a side view illustrating the in-situ pipe carrier 100 carrying a pipe section in accordance with embodiments of the present disclosure.

FIG. 4 is an end view illustrating the in-situ pipe carrier 100 carrying a pipe 310 in accordance with embodiments of the present disclosure.

FIG. 9 is a side view illustrating an in-situ pipe carrier 100 having carrying piston head rollers in accordance with embodiments of the present disclosure.

FIG. 10 is an orthographic view illustrating a motorized piston head roller in accordance with embodiments of the present disclosure.

FIG. 11 is an orthographic view illustrating a non-motorized piston head roller in accordance with embodiments of the present disclosure.

FIG. 12 is an end view illustrating the in-situ pipe carrier 100 having carrying piston head rollers in accordance with embodiments of the present disclosure.

FIG. 13 is a side view illustrating an in-situ pipe carrier 100 having an extended extension assembly in accordance with embodiments of the present disclosure.

DETAILED DESCRIPTION

Figure 1:
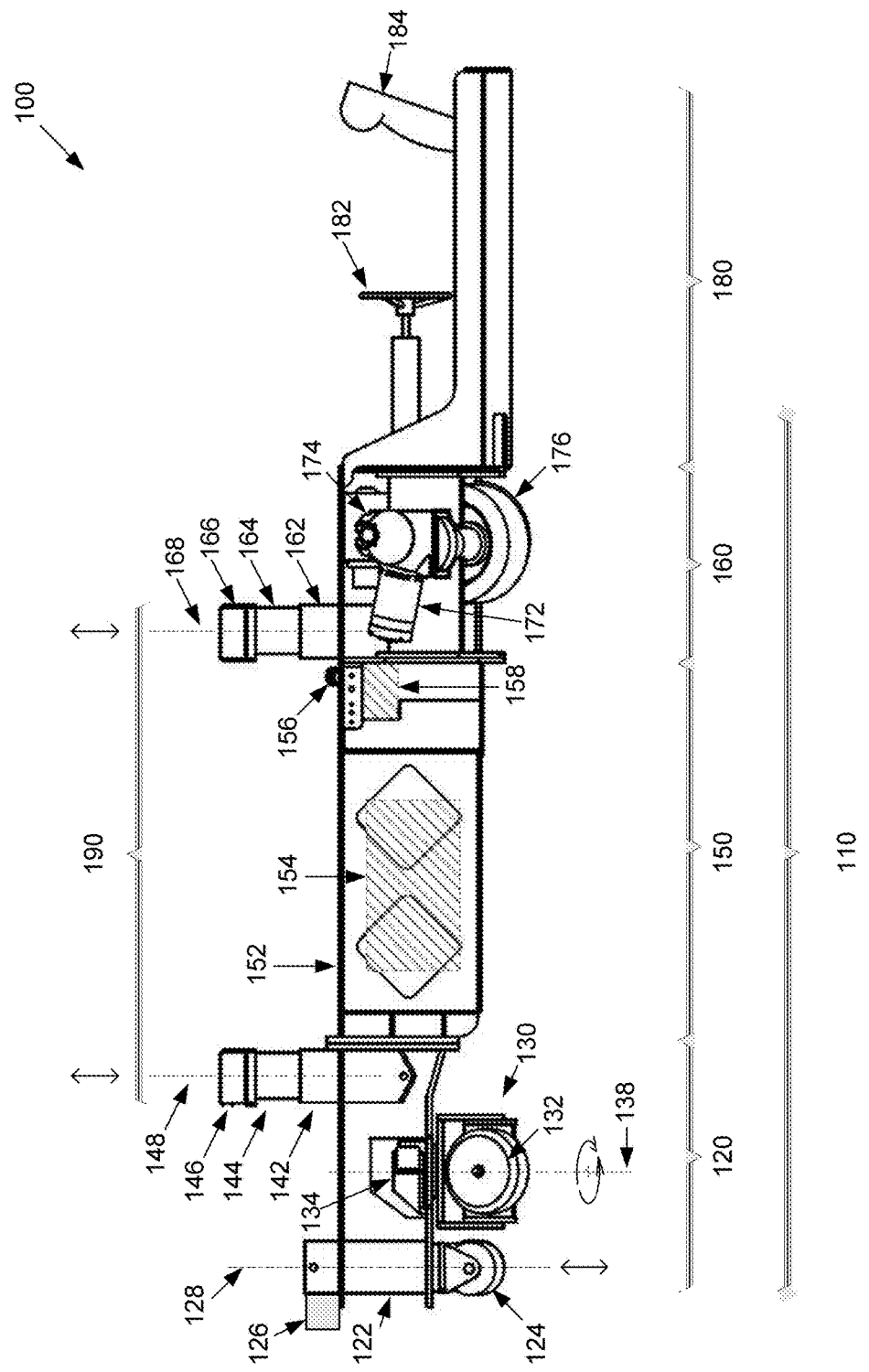
FIG. 1 is a side view illustrating an in-situ pipe carrier 100 in accordance with embodiments of the present disclosure.

Various embodiments are described in detail herein with reference to the drawings, wherein like reference numerals represent like parts and assemblies throughout the several views. Many details of certain embodiments of the disclosure are set forth in the following description and accompanying figures so as to provide a thorough understanding of the embodiments. Reference to various embodiments does not limit the scope of the claims attached hereto. Additionally, any examples set forth in this specification are not intended to be limiting and merely set forth some of the many possible embodiments for the appended claims.

The term "assembly" includes, for example, the meaning of a cooperating (e.g., working towards or assisting to achieve a common function) group of selected components. The term "assembly," for example, when used in context of a particular assembly does not necessarily exclude the grouping of any component that functionally cooperates with the particular assembly, and yet is physically assembled as a part of a different assembly (or a sub-assembly of the particular assembly). The term "wheel" includes, for example, the meaning of "a rotating support surface" (e.g., such as a wheel or a looped track or tread of a tracked vehicle), which permits lateral travel across a support surface while supporting a load. The term "pipe section(s)" includes, for example, the meaning of "pipe liner," unless the context clearly indicates otherwise. For example, a pipe liner can be formed by rolling a flat metal plate into an "unjoined" cylindrical shape, and positioning the unjoined, rolled liner in place (e.g., inside a pipe to be serviced). After the pipe liner has been placed and positioned (including rotating about a longitudinal axis), the pipe liner is welded or otherwise joined lengthwise (e.g., with respect to the forwards and rearwards length of the pipe and/or the in-situ pipe carrier 100) edges to form a joined, cylindrical pipe section.

FIG. 1 is a side view illustrating an in-situ pipe carrier 100 in accordance with embodiments of the present disclosure. The in-situ pipe carrier 100 is arranged to carry (e.g., transport) pipe sections through limited space areas, such as the interior of a previously installed pipe (see FIG. 3, for example). The in-situ pipe carrier 100 includes a front assembly 120, an extension assembly 150, and a rear assembly 160. The location of the front assembly 120 generally defines a forward(s) direction (e.g., illustrated as extending towards the left side of FIG. 1) whereas the location of the rear assembly 160 generally defines a rearward(s) direction (e.g., that extends towards the right side of FIG. 1) with respect to the orientation of the in-situ pipe carrier 100. In non-robotic embodiments for example, an optional operator station 180 is (e.g., removably) affixed to the in-situ pipe carrier 100. The operator station 180 includes various controls (e.g., operator controls 182) and is arranged to carry an operator of the carrier while the operator is controlling the carrier via the operator controls 182.

Generally described, the in-situ pipe carrier 100 is arranged to service (e.g., maintain, inspect, repair, functionally "replace," traverse, travel through, and the like) an existing (e.g., previously installed) pipe. The existing pipe can be serviced, for example, by installing one or more inner pipe sections as an inner "liner" (e.g., to form an inner coaxial pipe) for substantially replacing a functionality (e.g., to act as a conduit) of the existing (e.g., outer) pipe.

Generally described, the in-situ pipe carrier 100 includes a front assembly 120, an extension assembly 150, and a rear assembly 160. The front assembly 120, the extension assembly 150, and the rear assembly 160 are components of a frame 110. The front assembly 120, the extension assembly 150, and the rear assembly 160 are typically (e.g., removably) affixed (e.g., bolted) to adjacent assemblies (e.g., the front assembly 120 is affixed to the extension assembly 150, and the extension assembly 150 is affixed to the rear assembly 160). The frame 110 is arranged to travel (e.g., while being propelled by drive wheels 176 of the rear assembly 160) as a unit such that sub-assembly components (described below) affixed to the frame 110 are collectively positioned and oriented as a unit with respect to a pipe and/or pipe section. The frame 110 is typically constructed from a high strength material (e.g., steel) such that the structural integrity of the in-situ pipe carrier 100 is maintained when under loads (such as while the in-situ pipe carrier 100 is being hoisted by a crane or while the in-situ pipe carrier 100 is carrying pipe sections).

Each pair of adjacent assemblies (e.g., the front assembly 120 with extension assembly 150, and the extension assembly 150 with the rear assembly 160) are typically removably affixed (e.g., by bolting with removable nuts, rather than by, e.g., permanently welding) to each other. The removable fixation provides structural integrity to the frame 110 while also allowing for easy disassembly and modular replacement of the extension assembly 150. Removal of the fixatives (e.g., bolts and nuts) used to join adjacent assemblies allows, for example, the in-situ pipe carrier 100 to be disassembled into individual assemblies for convenient transportation as well as allows selection of customized extension assemblies (discussed below) for configuring the in-situ pipe carrier 100 in accordance with the requirements presented for servicing a particular pipe. For example, a particular extension assembly unit having a particular length (e.g., from a group of extension units having various lengths) can be selected and removably affixed between the front assembly and the rear assembly such that the length of the pipe-carrying region 190 is efficiently matched to the length of a particular pipe segment to be carried.

The frame 110 includes at least one sensor 126 affixed thereto. The sensor 126 can be a camera, transducer, feeler, rangefinder, gyro, level, or any sensing device, for example, for determining the presence of, the direction of, and/or the distance to various objects proximate to the in-situ pipe carrier 100. When affixed to the front assembly 120, the sensor 128 can optionally generate a video signal of a view forward (and/or adjacent to) the front assembly 120. The video signal can be coupled to a control processor 158 and/or a display for viewing by an operator of the in-situ pipe carrier 100 (e.g., for steering while driving/operating the in-situ pipe carrier 100 inside of an outer pipe as discussed below with reference to FIGS. 3 and 4). The control processor 158 can be a processor, control circuitry, a state machine arranged to control, for example, hydraulically actuated functions of the in-situ pipe carrier 100. As discussed below, the operator can be carried by the in-situ pipe carrier 100 or remote (e.g., including the meaning of "next to") to the in-situ pipe carrier.

Other various sensors 128 can be arranged along various points of the frame 110 in accordance with geometric principles, electronic instrumentation, and signal processing/computation such that the orientation and distance of the frame 110 with respect to one or more surrounding objects can be determined by the control processor 158 and/or operators of the in-situ pipe carrier 100. Accordingly, the in-situ pipe carrier 100 can be steered, driven, and otherwise operated by a human operator conveyed by the in-situ pipe carrier 100 in operator station 180, and/or robotically by the control processor 158 operating in response to sensor signals and/or remote operator (e.g., using wired or wirelessly coupled) controls.

The front assembly 120 includes a frame-lifting (e.g., frame-tilting) assembly (such as the nose piston assembly 122) for lifting a front portion of the frame 110. The nose piston assembly 122 includes an interim traveling support (e.g., wheel 124 occasionally used to support weight while traveling) and a lifting piston for extending and placing the interim traveling support on the support surface and for lifting a front portion of the in-situ pipe carrier 100 upward from the support surface. The piston of the nose piston assembly 122 is arranged to extend along a substantially vertical axis 128. The arrangement of the nose piston assembly 122 to extend along a substantially vertical axis helps to minimize, for example, the overall front-to-rear length of the in-situ pipe carrier 100 (e.g., as discussed below with reference to the extension assembly 150 below).

A first traveling support (e.g., steering bogey 130) is included (e.g., affixed) in a front portion of the in-situ pipe carrier 100. As the front portion of the in-situ pipe carrier 100 is lifted upwards by extension of the nose piston assembly 122, the steerable wheels 132 of the steering bogey 130 are lifted upwards from the support surface. Raising of the steerable wheels 132 allows a front portion of the in-situ pipe carrier 100 to be "slid" (e.g., in response to activation of rear drive wheels) over and across an edge (such as a lip of an inner or outer pipe segment as described with respect to FIG. 3 below). Accordingly, the pipe section being carried can be placed in a position that would otherwise be blocked by the steering bogey 130 such that the pipe section being carried can be abutted to a previously placed pipe section, for example.

When not being suspended above a support surface by the nose piston assembly 122, the steering bogey 130 supports an (e.g., front) portion of the frame 110 such that the frame 110 can slidably travel (e.g., roll on wheels) across the support surface. The frame 110 is steered (for example, when being driven in a forwards or a backwards direction) by controlling a degree of rotation (e.g., turning or steering) of the steering bogey 130 about a vertical axis 138. The steering bogey 130 is rotated (e.g., in either a clockwise or counter-clockwise direction) about the vertical axis 138 by a hydraulically actuated rack and pinion assembly 134 in response to commands received from the control processor 158 and/or operator controls such as a steering wheel 182.

The steering bogey 130 includes (e.g., one or more) steerable wheels 132. The steerable wheels 132 are typically non-drive (e.g., freewheeling) wheels in which each steerable wheel 132 rotates about a respective (e.g., end of an) axle. A portion (e.g., including the entire portion) of each respective axle is mechanically coupled between the steering bogey 130 and the corresponding steerable wheel 132). Each such steerable wheel 132 rotates about the respective axle in response to (for example) a motive force applied to (e.g., at least one) drive wheel 176 such that the frame 110 is driven (e.g., propelled) generally in a forwards or a backwards direction.

The front assembly 120 also includes a first lifting support (e.g., front carrying piston assembly 142, 144, 146), which operates in conjunction with (or independently from) a second lifting support (e.g., rear carrying piston assembly 162, 164, and 166). The first and second lifting supports are arranged to lift and carry (e.g., first and second portions of) an object (e.g., pipe section) to be carried by the in-situ pipe carrier 100. (Objects to be carried by the in-situ pipe carrier 100 are not necessarily pipe sections: objects such as sheet metal, beams, trusses, "patches" for occluding a breach in a pipe, and the like can be carried within the narrow confines of a pipe and/or tunnel in accordance with the disclosure herein.)

For example, the front carrying piston sleeve 142 and the rear carrying piston sleeve 162 are controllably (e.g., under operation of the control processor 158) actuated (e.g., pressurized) to respectively extend the front carrying piston 144 and the rear carrying piston 164 upwards in accordance with the respective axes 148 and 168. The front carrying piston 144 and the rear carrying piston 164 are respectively extended such that the front carrying piston head 146 and the rear carrying piston head 166 contact an upper inner surface of a pipe segment to be transported. (The front carrying piston 144 and the rear carrying piston 164 can be extended different lengths in accordance with, for example, different inner diameters of the pipe segment being carried.) The front carrying piston 144 and the rear carrying piston 164 are typically respectively extended until the pipe segment to be transported is elevated to a level suitable for transporting the pipe segment (e.g., within the inner circumference of an outer pipe to be serviced).

The front carrying piston assembly (142, 144, 146), and the rear carrying piston assembly (162, 164, and 166) are coupled to the frame 110, which form a pipe-carrying region 190 in and around which a pipe section is to be carried. The pipe-carrying region 190 includes a region of space, which can be defined in accordance with the front carrying piston head 146 and the rear carrying piston head 166. Accordingly, the pipe-carrying region is a region that typically includes the front carrying piston head 146, extends rearwards therefrom, and includes the rear carrying piston head 166. In addition, the pipe-carrying region can be described as a region of the in-situ pipe carrier that is behind the first traveling support (e.g., steerable wheels 132) and is in front of the second traveling support (e.g., drive wheels 176).

For example, the pipe-carrying region 190 is a cylindrically shaped region (e.g., volume) that envelops and encompasses—as well as includes the space spanned between—the front carrying piston assembly (142, 144, 146) and the rear carrying piston assembly (162, 164, and 166). The forward extent of the pipe-carrying region 190 is typically limited by the steerable wheel 132, whereas the rearward extent of the pipe-carrying region 190 is typically limited by the drive wheel 176. Accordingly, the pipe-carrying region can be a region defined by the size and shape of a pipe segment being carried by the in-situ pipe carrier 100.

The in-situ pipe carrier 100 includes the extension assembly 150, which typically lies within the pipe-carrying region such that the extension assembly 150 is substantially surrounded by a pipe segment (e.g., including joined or unjoined pipe liners) when the pipe segment is being carried. One or more extension assemblies 150 of various lengths can be selectively affixed so as to customize (e.g., match) the length of the pipe-carrying region 190 to the length of a specific pipe segment to be individually carried for a pipe to be serviced.

The extension assembly 150 includes a compartment 152 in which a source of energy (e.g., of energy for driving one or more components such as motors, pumps, solenoids, and the like) is carried. The source of energy can be a battery (including one or more batteries and/or cells) 154, capacitor, fuel cell, fuel tank (with fuel), compressed air, and the like. The energy source is carried in a position in the in-situ pipe carrier 100 that is, for example, at least partially rearwards from the first lifting support and at least partially forwards of the second lifting support. The energy source can also carried in a position in the in-situ pipe carrier 100 that is, for example, at least partially rearwards from the first (e.g., front) traveling support and at least partially forwards of the second (e.g., rear) traveling support. Accordingly, the energy source and the extension assembly 150 are (e.g., at least partially) coextensively included in the pipe-carrying region 190.

In various embodiments, an electrical battery is used to drive hydraulic pumps for actuating drive motors and pistons of the in-situ pipe carrier 100 such that, for example, noxious fumes are not produced and the need for a fresh air supply for an operator carried by the in-situ pipe carrier 100 is reduced. The energy source (e.g., battery) is selectively coupled for powering an optional drive unit of the front traveling support and the drive unit (e.g., motor 174) of the second traveling support (e.g., drive wheels 176). Each of the drive wheels 176 are independently controlled by a respective motor 174 to provide, for example, differential steering by driving each of the drive wheels 176 at different rates.

In various embodiments, the capacity (e.g., size) of the battery can be increased when using a longer (e.g., front-to-rear length) extension assembly 150 (and/or additional extension assembly compartments 152) such that an increased power budget is available for the in-situ pipe carrier 100). For example, when more power is carried/provided, the increased capacity of the energy source 154 provides power for the in-situ pipe carrier 100 to perform a combination of carrying larger (e.g., longer and heavier) pipe segments over longer distances and/or increased elevation grades. In an embodiment, a longer pipe-carrying region 190 is provided by a longer extension assembly 150 that is selected for carrying a longer (and, for example, heavier) pipe section, wherein the longer extension assembly 150 includes an increased capacity source of energy 154 such that the longer and heavier pipe segment can be carried over longer distances.

The modularity of the extension assembly 150 (and/or additional extension assembly compartments 152) facilitates configuration of a single in-situ pipe carrier 100 to provide optimal operation for servicing particular pipes. For example, unique limitations can be presented for any of a number of a particular pipe-servicing missions (such as where "smaller jobs" require "smaller carriers," and "larger jobs" require "larger carriers"). The modularity of the extension assembly 150 also allows quick reconfiguration without, for example, requiring modification or duplication of the (e.g., already "densely" configured) front assembly 120 or rear assembly 160. It can be seen that relatively more expensive subassemblies (such as the steering bogey 130 and the drive assembly) are included in the front assembly 120 and the rear assembly 160 (e.g., as compared to the extension assembly 150). Accordingly, costs are reduced when procuring additional extension assemblies 150 (e.g., of different lengths) for use with a given pair of the front assembly 120 and the rear assembly 160 (which allows for efficient re-use of the front assembly 120 and the rear assembly 160. Batteries carried with an extension assembly compartments 152 can be relatively easily swapped from one particular-length extension assembly 150 to another, which further reduces costs.

The extension assembly 150 also includes a hydraulic fluid reservoir 156 and the control processor 158. The hydraulic fluid reservoir 156 is for providing (and maintaining sufficient levels) hydraulic fluid in fluid communication with hydraulic pump 172 for actuating the drive motors and pistons of the in-situ pipe carrier 100.

In an embodiment, a third (e.g., middle) lifting piston is affixed to the extension assembly 150 (see FIG. 11). Inclusion of the hydraulic fluid reservoir 156 within the extension assembly 150 permits selection of a particular hydraulic fluid reservoir 156 having a capacity that is optimized for actuation of the sum total of the hydraulically driven devices of the in-situ pipe carrier, including both the hydraulically driven devices affixed to the extension assembly 150 and the hydraulically driven devices affixed to other portions of the frame 110.

Carrying a source 154 of energy (as well as the hydraulic fluid) for driving and/or operating the in-situ pipe carrier 100 within the extension assembly 150 efficiently (e.g., re-) uses, for example, front-to-rear (e.g., nose-to-rear) space of the in-situ pipe carrier 100 that is already allocated for carrying a pipe segment (e.g., the pipe-carrying region 190). Accordingly, carrying an (e.g., increased capacity) source 154 of energy (and hydraulic fluid) within the pipe-carrying region 190 does not (e.g., necessarily) increase the overall front-to-rear length of the in-situ pipe carrier 100. Minimizing the overall front-to-rear length of the in-situ pipe carrier 100 increases the maneuverability and accessibility of the in-situ pipe carrier 100 in "in-situ" situations (e.g., where previously installed pipes have confined access locations).

A first confined situation include situations where the in-situ pipe carrier 100 must (e.g., at least partially) traverse curved or angularly jointed sections of a pipe to be serviced. Accordingly, a shorter length of the in-situ pipe carrier 100 increases the ability (e.g., likelihood of success) of the in-situ pipe carrier 100 to negotiate (e.g., traverse) various turns presented by a pipe to be serviced.

A second confined situation includes situations where an access hole (which is typically dug above and at a right angle to a pipe to be serviced) is used by a crane to lower the in-situ pipe carrier 100 to a surface substantially level with the inner surface of a pipe to be serviced. Accordingly, smaller access hole "footprints" are allowed (and less fill dirt would be have to be excavated and/or temporarily stored) for ingress and egress of the in-situ pipe carrier 100.

The rear assembly 160 includes the rear carrying piston assembly (162, 164, and 166) for lifting and carrying a pipe section. As described above, the rear carrying piston assembly (162, 164, and 166) typically works in conjunction with the forward carrying piston assembly (142, 144, and 146) to lift and carry pipe segments. Accordingly, the rear assembly includes a second lifting support (e.g., the rear carrying piston assembly) for supporting an (e.g., rear) portion of the object to be carried by the carrier.

The rear assembly 160 also includes a drive assembly (see, for example, drive assembly 800, discussed below), which includes hydraulic pump(s) 172, hydraulic motor(s) 174, and drive wheel(s) 176. The hydraulic pumps are arranged to receive power (e.g., via power cables) from the energy source 154 and to pressurize hydraulic fluid from the hydraulic reservoir 156 (e.g., by converting the electrical energy into a hydraulic pressure). The pressurized hydraulic fluid is in fluid communication with the hydraulic motor 174, which (in turn) is mechanically coupled to a respective drive wheel 176. The hydraulic motor 174 is arranged to (e.g., selectively) drive the respective drive wheel 176 (e.g., in rotational movement about an axle of the drive wheel 176) in accordance with the pressure of the pressurized hydraulic fluid and controls (e.g., mechanically and/or electrically conveyed) from the control processor 158.

As discussed below with reference to FIG. 8, the drive assembly (e.g., 800) can be selectively affixed (e.g., bolted) to frame 110 such that the clearance of the bottom of the frame 110 to a driving surface can be selectively arranged. The clearance of the bottom of the frame 110 to a driving surface can be selectively adjusted by, for example, bolting the drive assembly to the frame 110 (e.g., rear assembly 160) by using (e.g., pre-drilled) bolt holes selected in accordance with the selected clearance height. Accordingly, the rear assembly 160 includes a second traveling support (e.g., drive wheels 176) for supporting the frame while traveling across a support surface, and where the second traveling support is included in a rear portion of the in-situ pipe carrier 100.

In non-robotic embodiments (for example), an operator's station 180 is attached (e.g., bolted) to the rear of the rear assembly 160. The operator's station includes operator controls (such as a steering wheel 182) and operators seat 184, which permits the operator to sit while (e.g., semi-) reclining while facing in a forward direction (e.g., which reduces operator fatigue as compared with facing sideways). Minimizing the overall front-to-rear length of the in-situ pipe carrier 100 (as discussed above with respect to the extension assembly 150) also provides more front-to-rear length (e.g., for a given pipe servicing scenario) of the in-situ pipe carrier 100 in which to ergonomically and safely position an operator of the in-situ pipe carrier 100. In confined situations, the in-situ pipe carrier can be operated by (e.g., tethered hand-held and/or networked) operator's controls where the operator is not necessarily carried by the in-situ pipe carrier 100 (for example, where the operator's station 180 is not attached to the in-situ pipe carrier 100, which shortens the overall front-to-rear length of the in-situ pipe carrier 100). Accordingly, the overall length of the in-situ pipe carrier 100 can be minimized by at least providing a vertically oriented nose piston assembly 122 (e.g., which does not increase the overall length while being extended or retracted, by carrying the energy source "amidships" (e.g., between) the steerable wheels 132 and drive wheels 176, and by not including the operator station 180 (and instead, for example, providing hand-held, networked operator controls 182).

The operator controls are coupled to the control processor 158 such that, for example, operator commands are conveyed to the control processor 158. The control processor 158 is transformed by software into a special purpose machine arranged to, for example, to execute instructions for performing tasks specific to the in-situ pipe carrier 100. Such tasks include: lifting the front assembly 120, steering the in-situ pipe carrier 100, driving the in-situ pipe carrier 100 forwards and backwards, lifting a pipe via the rear carrying piston assembly (162, 164, and 166) and forward carrying piston assembly (142, 144, and 146), and the like.

The operator controls are optionally configured to perform "drive-by-wire" operations, which, for example, lighten an operator's workload (which in turn enhances safety in a hazardous environment). For example, an operators command (e.g., received from an operator control) to "lift a pipe section to be carried" is controlled by the control processor 158 responsive to input from sensors 126. The control processor 158 includes (and/or is coupled to) memory containing executable instructions for determining the orientation and clearance of the in-situ pipe carrier (e.g., with respect to a surrounding outer pipe or other objects), determining a safe distance in which to lift a pipe section, and individually and collectively controlling the front and rear carrying piston assemblies such that a pipe section to be carried is raised evenly (e.g., parallel to the ground support surface) within the determined safe distance. The control processor 158 includes (and/or is coupled to) memory containing executable instructions (e.g., software) for other functions, such as described below with respect to FIG. 3.

FIG. 2 is an end view illustrating the in-situ pipe carrier 100 in accordance with embodiments of the present disclosure. In general, lifting piston assemblies are centered along (e.g., over, in, or below) a centerline 208 of the in-situ pipe carrier 100, whereas support wheels are arranged in positions offset (e.g., in mirrored configuration) from the centerline 208. (The centerline 208, for example, lies in a notional plane defined by the axes 148 and 168, wherein the centerline 208 lies substantially perpendicular to the axes 148 and 168.)

For example, each of the nose piston assembly 122, the forward carrying piston assembly (142, 144, and 146), and the rear carrying piston assembly (not shown) are affixed to the frame 110 along the centerline 208 (which, for example, helps ensure even balancing of lifted objects while the pistons are extended). In contrast, each of the lifting wheels 124, each of the steerable wheels 132, and each of the drive wheels 176 are offset from the centerline 208 (which, for example, increases stability and the torque that would otherwise be required to overturn the frame 110). However, the lifting wheels (124), steerable wheels (132), and drive (176) wheels are also positioned (e.g., offset) bilaterally symmetrically such that no substantial net torque (e.g., due to gravity) accumulates in the frame 110. (As illustrated in FIG. 4, for example, the lifting (124), steerable (132), and drive (176) wheels are cambered in accordance with a tangent of an inner surface of a pipe to be at least partially driven through.)

Compartment 152 of the extension assembly 150 is positioned along (including adjacent to, subjacent to, and/or superjacent to) the centerline 208. Accordingly, the source(s) of energy (battery and/or batteries) 154 can be compartmentally carried in a position that such that, for example, the center of gravity of the in-situ pipe carrier 100 (through which the centerline 208 optionally extends) is not substantially moved from a centered position (e.g., through which the centerline 208 extends).

FIG. 3 is a side view illustrating the in-situ pipe carrier 100 carrying a pipe section in accordance with embodiments of the present disclosure. In an initial state, the in-situ pipe carrier 100 is unloaded (e.g., not carrying a pipe section) with the nose piston assembly 122, the front carrying piston 144, and the rear carrying piston 164 in the retracted position (e.g., up, down, and down positions, respectively). To load the pipe section 310, the in-situ pipe carrier 100 is initially (e.g., pre-) positioned (e.g., driven or parked) such that the in-situ pipe carrier 100 rests on a first supporting surface, faces an open end of the pipe section 310, and is aligned lengthwise in accordance with the longitudinal (e.g., end-to-end) axis (e.g., centerline 208) of the pipe section 310.

In response to a first command received from the control processor 158 (and/or operator), the in-situ pipe carrier 100 is incrementally driven forward (e.g., responsive to power coupled to the drive wheels from the energy source 154) into the near opening of the pipe section 310. The in-situ pipe carrier 100 is incrementally driven forward into the near opening of the pipe section 310 until, for example, the lifting wheels 124 traverse (e.g., without contacting) the edge of the near (e.g., relative to the in-situ pipe carrier 100 operator) opening of the pipe section 310 and are substantially above a (e.g., solid) lower portion of the inner surface of the pipe section 310 (e.g., a second supporting surface).

In response to a second command received from the control processor 158 (and/or operator), the nose piston assembly 122 extends (e.g., forcibly drives responsive to power coupled to the nose piston assembly 122 from the energy source 154) the lifting wheels 124 downwards along axis 128. The lifting wheels 124 are driven downwards until the nose wheels 124 rest upon a lower portion of the inner surface of the pipe section 310 (e.g., the second supporting surface). The lifting wheels 124 are hydraulically driven in a downwards direction such that the front assembly 122 is lifted upwards and the frame 110 is rotated about axles of the drive wheels 176. (In an embodiment that does not include the operator station 180, the frame 110 is free to rotate over a greater range.) As the front assembly 122 is lifted upwards, the steerable wheels 132 of the steering bogey 130 are also lifted upwards from the first supporting surface (e.g., previously driven upon). Typically, the lifting wheel 124 is extended downwards until the steerable wheels 132 are lifted to a level that is higher than a level of the second supporting surface. Accordingly, the steerable wheels are lifted to a height that is sufficient to clear (e.g., traverse without contacting) a first edge to be negotiated (e.g., of the lower portion of the near end of the pipe section 310).

In response to a third command received from the control processor 158 (and/or operator), the in-situ pipe carrier 100 is driven forward by the drive wheels 176 into the pipe section 310. The lifting wheels 124 rotate in response to the driving force provided by the drive wheels 176 such that the front assembly 120 is advanced (e.g., "slid") further into the opening of the pipe section 310. The front assembly 120 is advanced into the opening of the pipe section 310 until, for example, the steerable wheels 132 of the steering bogey 130 are substantially above a (e.g., solid) lower portion of the inner surface of the pipe section 310 (e.g., the second supporting surface). When the steerable wheels 132 are suspended, (e.g., relatively limited) steering can be provided for maneuverability by differentially driving the drive wheels 176.

In response to a fourth command received from the control processor 158 (and/or operator), the nose piston assembly 122 retracts (e.g., forcibly retracts) the lifting wheels 124 upwards along axis 128. The lifting wheels 124 are hydraulically retracted in an upwards direction such that the front assembly 122 is lowered downwards and the frame 110 is rotated about axles of the drive wheels 176. As the front assembly 122 is lowered downwards, the steerable wheels 132 of the steering bogey 130 are placed on the second supporting surface (e.g., the inner surface of the pipe section 310). Typically, the lifting wheel 124 is extended upwards into a fully retracted position.

In response to a fifth command received from the control processor 158 (and/or operator), the in-situ pipe carrier 100 is driven further forward by the drive wheels 176 into the pipe section 310. The steerable wheels 132 rotate in response to the driving force provided by the drive wheels 176 such that the front assembly 120 is advanced (e.g., "slid") further into the opening of the pipe section 310. The front assembly 120 is advanced further into the opening of the pipe section 310 until, for example, the lifting wheels 124 traverse the edge of the far (e.g., relative to the in-situ pipe carrier 100 operator) opening of the pipe section 310 and are substantially above the first supporting surface.

In response to a sixth command received from the control processor 158 (and/or operator), the nose piston assembly 122 extends (e.g., forcibly drives) the lifting wheels 124 downwards along axis 128 until the nose wheels 124 rest on the first supporting surface. The lifting wheels 124 are hydraulically driven in a downwards direction such that the front assembly 122 is lifted upwards and the steerable wheels 132 of the steering bogey 130 are also lifted upwards from the second supporting surface (e.g., of a lower portion of the inside surface of the pipe section 310). Typically, the lifting wheel 124 is extended downwards until the height of the steerable wheels 132 is sufficient to clear (e.g., traverse without contacting) a second edge to be negotiated (e.g., of a lower portion of the far end of the pipe section 310).

In response to a seventh command received from the control processor 158 (and/or operator), the in-situ pipe carrier 100 is driven further forward by the drive wheels 176 into the pipe section 310. The lifting wheels 124 rotate in response to the driving force provided by the drive wheels 176 such that the steerable wheels 132 of the steering bogey 130 are advanced beyond the far end of the pipe section 310 and are suspended above the first supporting surface.

In response to an eighth command received from the control processor 158 (and/or operator), the nose piston assembly 122 retracts (e.g., forcibly retracts) the lifting wheels 124 upwards along axis 128. As the front assembly 122 is lowered downwards, the steerable wheels 132 of the steering bogey 130 are placed on the first supporting surface such that the in-situ pipe carrier "straddles" the pipe section 130 and an upper portion of the inner surface of the pipe section 130 lies over the (e.g., currently retracted) front carrying piston 144 and the rear carrying piston 164.

In an embodiment described below with reference to FIG. 9 and FIG. 12 below, a cradle 920 is disclosed having a recessed trough 922 adapted to conform to an outer surface of the pipe section 310. The recessed trough is recessed by a depth selected to provide a second supporting surface 924 as the same level as the first supporting surface (e.g., for the steering and drive wheels of the in-situ pipe carrier 100) when the pipe section 310 is placed in the recessed trough 922. Accordingly, operations associated with the first through eighth commands are substantially reduced, if not eliminated, because the near and far edges of a lower portion of the pipe section 310 do not have to be negotiated (e.g., by stepping the nose up and down to cross) when using the cradle 920. Instead, the in-situ pipe carrier can be simply "threaded" (without height adjustments) by driving across the second supporting surface 924 and into a position "straddling" the pipe section 130.

After the ninth command (discussed below) has been executed to lift the pipe section 310, egress from the recessed trough 920 while carrying the pipe segment 310 can be accomplished by hoisting or driving. In one example, a crane can hoist the pipe-carrying in-situ pipe carrier 100 from the recessed trough 920. In another example, a temporary spacer (such as planks) can be placed in the recessed trough 920 under the lifted pipe section 310. The spacer placed in the recessed trough 920 (e.g., again) renders the level of the second supporting surface 924 to the same level as the first supporting surface (e.g., when driving either the steerable 132 or drive 176 wheels over the temporary spacer.

In response to a ninth command received from the control processor 158 (and/or operator), the front carrying piston 144 and the rear carrying piston 164 are extended upwards along axes 148 and 168 respectively such that the upper surface of the piston heads 146 and 166 contact an upper portion of the inner surface of the pipe section 130. The front carrying piston 144 and the rear carrying piston 164 are further extended upwards along axes 148 and 168 respectively, the pipe section 130 is lifted upwards (e.g., using energy from the energy source 154) from the first supporting surface. The pipe section 130 is lifted upwards) from the first supporting surface such that the in-situ pipe carrier carries (e.g., supports in a position suspended above the first support surface) the lifted pipe section 130. With the pipe section 130 being suspended above the first support surface, the in-situ pipe carrier 100 is free to drive in an (e.g., relatively arbitrary) direction using the drive wheels 176 to propel the in-situ pipe carrier 100 while carrying the pipe section 130 and using the steerable wheels 132 of the steering bogey 130. The steerable wheels 132 provide steering capability to maneuver the in-situ pipe carrier 100 into a position for driving into an "outer" pipe to be serviced (e.g., pipe 320).

In response to a tenth command received from the control processor 158 (and/or operator), the in-situ pipe carrier 100 is incrementally driven forward across ramp 330 (not-to-scale) and into the near opening of the pipe section 320. The in-situ pipe carrier 100 is incrementally driven forward until, for example, the lifting wheels 124 traverse (e.g., without contacting) the edge of the near opening of the pipe section 320 and are substantially above a (e.g., solid) lower portion of the inner surface of the pipe section 320 (e.g., a third supporting surface). (Accordingly, the position and configuration of the in-situ pipe carrier 100 after execution of the tenth command is substantially represented by FIG. 3.) Pipe section 320, for example, is another pipe section (e.g., previously) installed to "line" (e.g., as a pipe liner) or otherwise service pipe 300.

In response to an eleventh command received from the control processor 158 (and/or operator), the nose piston assembly 122 extends (e.g., forcibly drives) the lifting wheels 124 downwards along axis 128 until the nose wheels 124 rest upon a lower portion of the inner surface of the pipe section 320 (e.g., the third supporting surface). Typically, the lifting wheel 124 is extended downwards until the height of the steerable wheels 132 is sufficient to clear (e.g., traverse without contacting) a first edge of pipe 320 to be negotiated (e.g., of the lower portion of the near end of the pipe section 320).

In response to a twelfth command received from the control processor 158 (and/or operator), the in-situ pipe carrier 100 is driven further forward by the drive wheels 176 into the pipe section 320. The front assembly 120 is advanced further within pipe section 320 until, for example, the steerable wheels 132 of the steering bogey 130 are substantially above a (e.g., solid) lower portion of the inner surface of the pipe section 320 (e.g., the third supporting surface).

In response to a thirteenth command received from the control processor 158 (and/or operator), the nose piston assembly 122 retracts (e.g., forcibly retracts) the lifting wheels 124 upwards along axis 128 such that, for example, the front assembly 122 is lowered. As the front assembly 122 is lowered downwards, the steerable wheels 132 of the steering bogey 130 are placed on the third supporting surface (e.g., the inner surface of the pipe section 320). Typically, the lifting wheels 124 are retracted upwards into a fully retracted position.

In response to a fourteenth command received from the control processor 158 (and/or operator), the in-situ pipe carrier 100 is driven further forward by the drive wheels 176 into the pipe section 320. The front assembly 120 is advanced further into the opening of the pipe section 310 until, for example, the edge of the far (e.g., with respect to the operator position) end of the pipe section 310 abuts (or is adjacent to) the edge of the near end of the pipe 320. The pipe section 310 can be joined to the pipe section 320 by physical contact, welding, caulking, mortaring, and the like.

In response to a fifteenth command received from the control processor 158 (and/or operator), the front carrying piston 144 and the rear carrying piston 164 are retracted downwards along axes 148 and 168 respectively such that the pipe section 130 is lowered downwards toward and rests upon the lower portion of the inner surface of the pipe 300. The piston heads 146 and 166 are typically fully retracted to maximize clearance with respect to the upper portion of the inner surface of the pipe section 130.

In response to a sixteenth command received from the control processor 158 (and/or operator), the in-situ pipe carrier 100 is driven backward by the drive wheels 176 out of the pipe 300. The nose piston assembly can be used to negotiate the near ends of the inner pipe section 310 and the outer pipe 300 in a similar manner using commands (although in a reverse order) as described above. Accordingly, pipe section 310 is placed (e.g., "left" or "installed") in outer pipe 300 in a position that is adjacent to (e.g., abutted to) pipe section 320.

FIG. 4 is an end view illustrating the in-situ pipe carrier 100 carrying a pipe 310 in accordance with embodiments of the present disclosure. In general, the lifting piston assemblies are centered such that the carrying piston heads (such as the front carrying piston head 146) supports a pipe section to be carried (e.g., pipe section 310) above a lower portion of the inside surface of pipe 310. In contrast, the support wheels (132 and 176) are supported by a lower portion of the inside surface of pipe 310.

Figure 5:
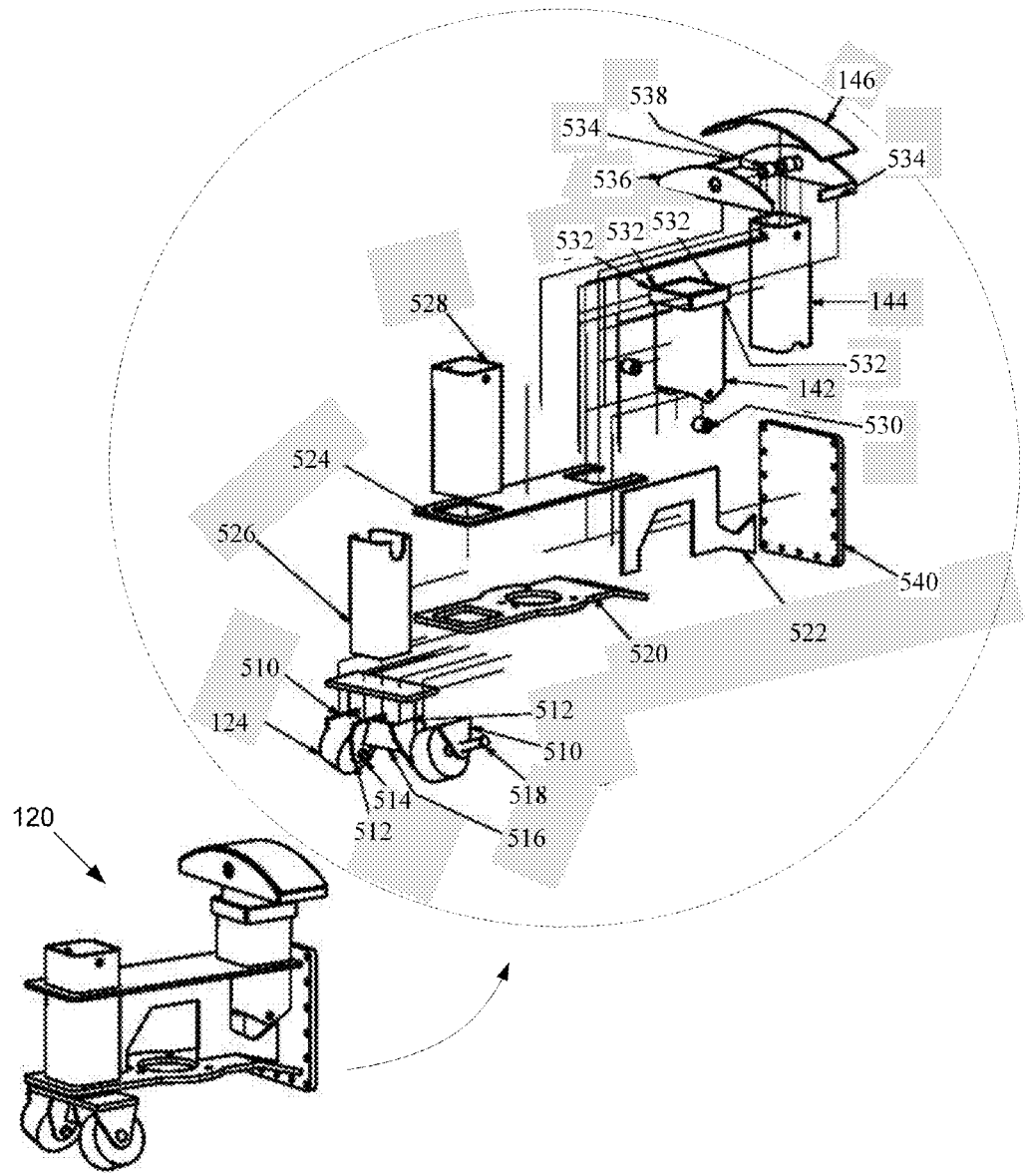
FIG. 5 is an orthographic view illustrating the front assembly in accordance with embodiments of the present disclosure.

FIG. 5 is an orthographic view illustrating the front assembly 120 in accordance with embodiments of the present disclosure. The nose piston assembly 122 includes wheel 124, piston sleeve 526 and piston 528. The wheel 124 is rotatably captivated by one or more of the outside wheel bracket 510, inside wheel bracket 512 (e.g.) having axle hole 514, spreader plate 516, and axle 518. The piston 528 is slidably captivated by the piston sleeve 526, which in turn is affixed to the bottom plate 520, the lateral shear plate 522, and the top plate 524. The bottom plate 520, the lateral shear plate 522, and the top plate 524 are affixed to the inter-assembly mounting plate 540, which includes through-holes for mounting bolts (not necessarily shown) being spaced in accordance with a selected height for the extension assembly 140.

The front piston carrying assembly includes piston sleeve 142, piston 144, and front carrying piston head 146. The piston sleeve 142 is captivated by the bolts 530 at a proximal end and includes a collar 532 at a distal end. The piston 144 is arrange to slidably extend from the distal end of the piston sleeve 142. The front carrying piston head 146 is affixed to arc segment plates 536 and end plates 534, which in turn are rotatably affixed to the piston 144 via bushings 538. Accordingly, the front carrying piston head 146 adjusts about the bushings 538 to conform to an upper portion of an inner surface of a pipe to be carried (e.g., pipe 310).

Figure 6:
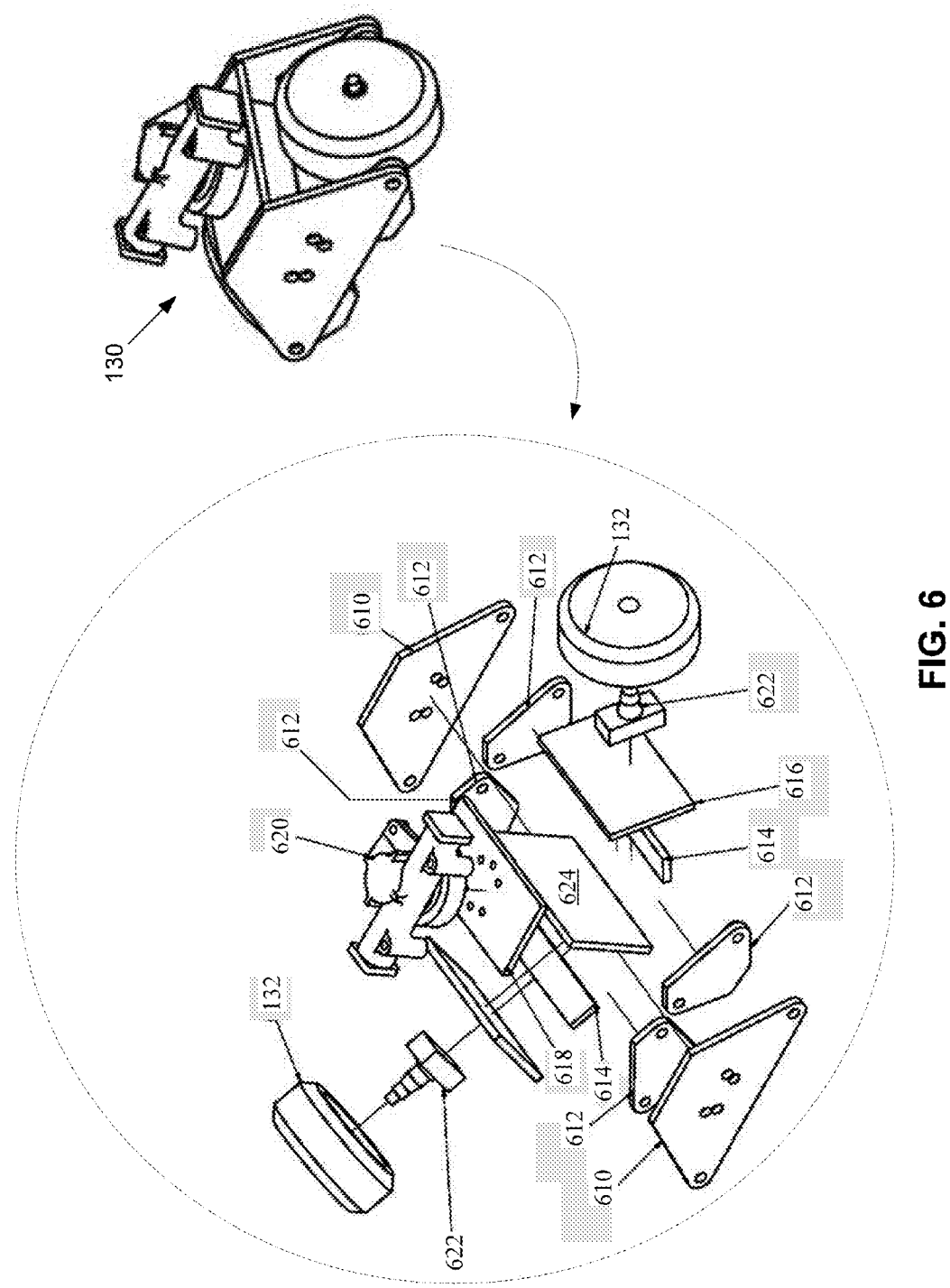
FIG. 6 is an orthographic view illustrating the steering bogey in accordance with embodiments of the present disclosure.

FIG. 6 is an orthographic view illustrating the steering bogey in accordance with embodiments of the present disclosure. The steering bogey 130 includes steerable wheels 132 and a rack-and-pinion steering sub-assembly 620 for steering the steerable wheels 132. Each steerable wheel 132 is rotatably captivated by spindle 622, which in turn is affixed to spindle plate 616. Each spindle plate 616 is affixed to top plate 618, transverse shear plate 624, and opposing pairs of end-angle plates 612. Adjacent pairs of end-angle plates 612 are affixed to end plates 610. The rack-and-pinion sub-assembly 620 is affixed to the front assembly 120 via top plate 618 and bottom plate 520. Generally, the illustrated through-holes provide attachment points for affixing the illustrated components using, for example, pins or bolts (not necessarily shown).

Figure 7:
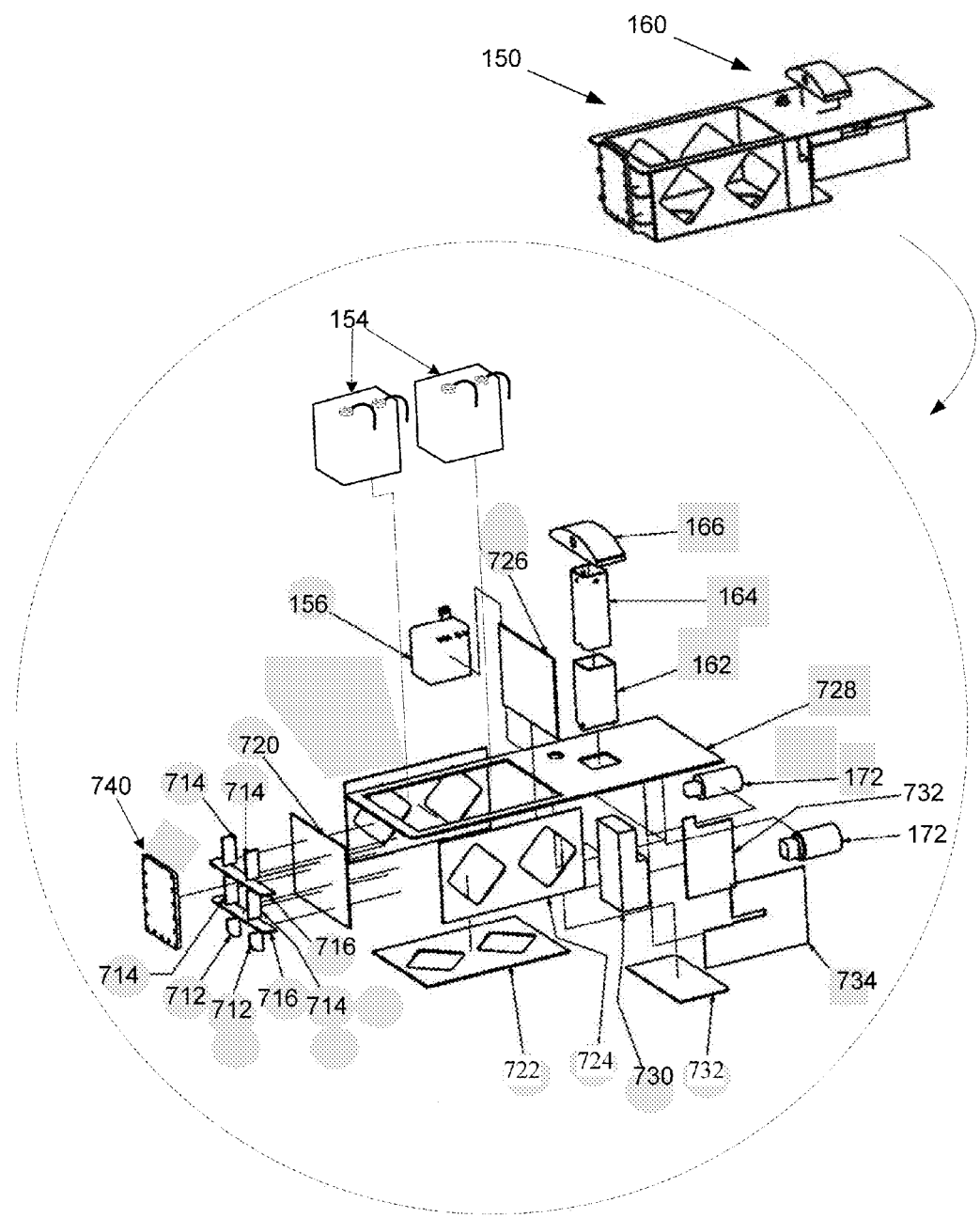
FIG. 7 is an orthographic view illustrating a rear assembly in accordance with embodiments of the present disclosure.

FIG. 7 is an orthographic view illustrating an extension assembly 150 and a rear assembly 160 in accordance with embodiments of the present disclosure. The extension assembly 150 includes inter-assembly mounting plate 740 (e.g., for removably affixing to inter-assembly mounting plate 540). The inter-assembly mounting plate 740 is affixed (e.g., welded) to a standoff assembly, which includes rounded vertical standoffs 712, vertical standoffs 714, and horizontal standoffs 716. The standoff assembly provides, for example, shear protection and tool and hand access to the mounting holes in the inter-assembly mounting plate 740 for removably affixing the front assembly 120 to the extension assembly 150. The standoff assembly is affixed to the front compartment plate 720. The compartment 152 includes the front compartment plate 720, the side compartment plates 724, the rear compartment plate 726, and a portion of the top compartment plate 728. Energy source 154 (e.g., batteries) are included (e.g., carried) in the compartment 152.

The rear assembly 160 includes a portion of the top compartment plate 728, rear carrying piston assembly mount 730, shelf 732, and shear panel 734. The rear carrying piston sleeve 162 is (e.g., removably) affixed to the rear carrying piston assembly mount 730 on a proximal end and in which the rear carrying piston 164 is slidably captivated on a distal end. The rear carrying piston head 166 is rotatably affixed to the rear carry piston 164. The reservoir 148 is mounted (e.g., removably affixed) to the top of shelf 732. The pumps 172 are mounted to the drive assembly 800 (described below with reference to FIG. 8). The pumps 172 are for receiving energy (e.g., and electrical current) from an energy source 154 (e.g., the batteries), for converting the received energy (e.g., by driving an electrical motor arranged to pressurize a hydraulic fluid received from reservoir 158), and for supplying the converted energy for driving the in-situ pipe carrier 100 (e.g., for powering motors 174 for driving drive wheels 176).

Figure 8:
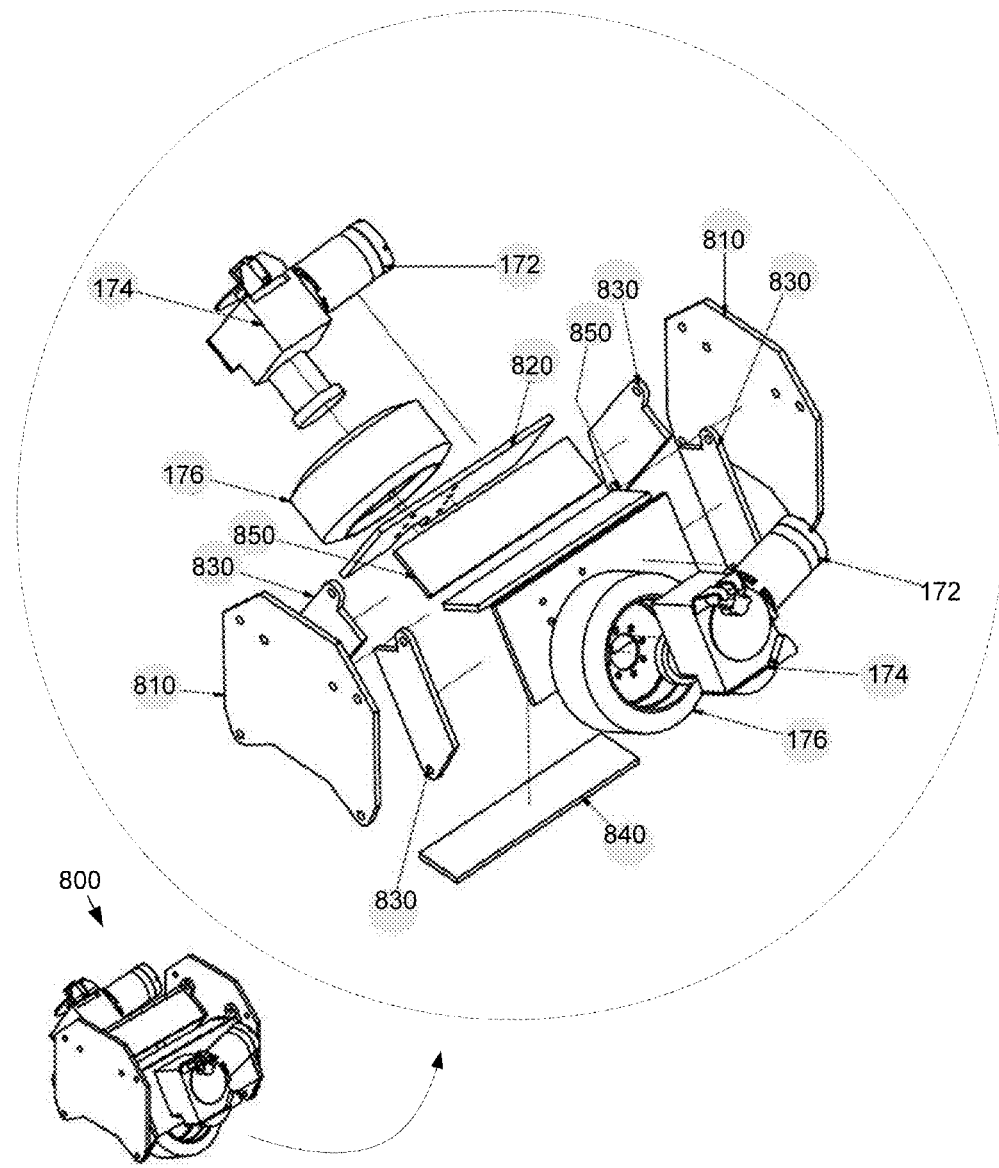
FIG. 8 is an orthographic view illustrating the drive assembly in accordance with embodiments of the present disclosure.

FIG. 8 is an orthographic view illustrating the drive assembly in accordance with embodiments of the present disclosure. The drive assembly 800 includes a pump 172 and a motor 174 for converting potential energy (e.g., electrical or hydraulic) into kinetic energy (e.g., rotation) for turning the drive wheel(s) 176 such that the in-situ pipe carrier 100 is driven and/or steered (e.g., via differential steering). Each drive wheel 176 is rotatably captivated by a motor 174 assembly, which in turn is affixed to axle mounting plate 820. Each axle mounting plate 820 is affixed to top plate 850, bottom plate 840, and opposing pairs of end-angle plates 830. Adjacent pairs of end-angle plates 830 are affixed to a respective (e.g., front or rear) end plate 810.

A slot is formed generally between adjacent edges of top plates 850, such that the shear panel 734 passes between the adjacent edges of the top plates 850 as the drive assembly 800 is inserted upwards into and (e.g., removably) affixed to the rear assembly 160. The drive assembly 800 is affixed to the rear assembly 160, for example, via through-holes in the forward end plate 810 (where end plate 810 through-holes are aligned with a set of through-holes of 726 of a selected elevation). Accordingly, the drive wheel clearance can be selectively varied by adjusting the relative height (e.g., with respect to the frame 110) of the drive wheels 176. Generally, the illustrated through-holes provide attachment points for affixing the illustrated components (using, for example, pins or bolts). The attachment points are arranged at varying heights such that a height (e.g., of through-holes for bolts) at which to affix the drive assembly 800 to the rear assembly 160 can be selected.

FIG. 9 is a side view illustrating an in-situ pipe carrier 900 having carrying piston head rollers in accordance with embodiments of the present disclosure. In general, the piston head rollers are arranged to rotate a pipe section (including a pipe liner sheet) 910 about a longitudinal axis of the in-situ pipe carrier 900. For example, the in-situ pipe carrier 900 includes a non-motorized piston head roller 926 and a motorized piston head roller 946. The non-motorized piston head roller 926 and the motorized piston head roller 946 are illustrated in a retracted position, which (for example) allows the front portion of the in-situ pipe carrier 900 to be driven through the center of the pipe section 910.

The in-situ pipe carrier 900 is driven through the center of the pipe section 910 such that the non-motorized piston head roller 926 and the motorized piston head roller 946 are positioned beneath an upper portion of the pipe section 910. As the non-motorized piston head roller 926 and the motorized piston head roller 946 are extended upwards, the pipe section 910 is raised from off of the surface of the trough 922 of cradle 920 (also, see FIG. 12). After the pipe section 910 has been raised from the surface of the trough 922 of cradle 920, the motorized piston head roller 946 is actuated (e.g., hydraulically driven) to rotate the pipe section 310 longitudinally (e.g., about the longitudinal axis). The pipe section 910 is rotated until a selected feature (e.g., pipe joint key, spline, seam 1222, and the like) of the pipe section 910 is rotated to an indicated position. For example, when the pipe section 910 is a pipe liner including an (e.g., unwelded) seam 1222, the pipe section 910 is rotated until the featured seam 1222 reaches a bottommost position. With the seam 1222 in a bottommost position, the pipe section 910 can be safely carried (e.g., because the pipe section is balanced) and the seam 1222 can be conveniently welded after the pipe section 910 is placed into position (with the unwelded seam 1222 in a bottommost position).

FIG. 10 is an orthographic view illustrating a motorized piston head roller in accordance with embodiments of the present disclosure. The motorized piston head roller 946 includes a piston arm 1014, which includes a roller wheel 1016 arranged at the distal end of the piston arm 1014. The roller wheel 1016 is arranged to be rotationally driven about an axle having a first end rotatably captivated by end bearing 1020 (affixed to the piston arm 1014) and a second end rotatably captivated by end bearing 1030 and transmission 1050. The end bearing 1030 and the transmission 1050 are housed in the transmission housing assembly 1040, which is affixed between the piston arm 1014 and the roller wheel motor 1060. The transmission is arranged to convert the torque output by the roller wheel motor 1060 to a torque suitable for rotating the pipe section 910. In various embodiments, the roller wheel motor 1060 is powered by hydraulic fluid pressurized and received from the reservoir 156.

FIG. 11 is an orthographic view illustrating a non-motorized piston head roller in accordance with embodiments of the present disclosure. The non-motorized piston head roller 926 includes a piston arm 1014, which includes a roller wheel 1116 arranged at the distal end of the piston arm 1014. The roller wheel 1116 is arranged to be freewheeling about an axle 1140 having a first end rotatably captivated by end bearing 1020 (affixed to the piston arm 1014) and a second end rotatably captivated by end bearing 1130 (also affixed to the piston arm 1014). The roller wheel 1116 is arranged to rotate responsively to rotation of the pipe 910, which in turn rotates responsively to the roller wheel 1016 being driven by the roller wheel motor 1060.

FIG. 12 is an end view illustrating the in-situ pipe carrier 100 having carrying piston head rollers in accordance with embodiments of the present disclosure. In an example scenario for loading a pipe section 910, a cradle 920 is provided for supporting and stabilizing the pipe section 910. The cradle 920 can be loaded by a crane by hoisting and lowering a pipe section 910 into the recessed trough 922 of the cradle 920. The recessed trough 920 has an upper surface shaped to receive and/or conform to an outer surface of the pipe section 310 (e.g., where both such surfaces are cylindrically shaped). The conformal shape of the recessed trough 920 and the relatively broad width of the cradle 910 provide lateral support to inhibit a sideways rolling of the pipe section 910 that may occur if the in-situ pipe carrier is not exactly centered while the in-situ pipe carrier 900 is driven through the pipe section 910.)

The recessed trough 920 is recessed by a level selected to render the level of a lower portion of the inside portion of the pipe section 910 to be substantially even with approach surfaces of the cradle. For example, the lower portion of the inside surface of the pipe section 910 (e.g., for directly supporting the steerable 132 or drive 176 wheels) is brought to the same level of the (e.g., drivable) surfaces 924 of the approach surfaces when the pipe section 910 is placed in the recessed trough 920.

The pipe section 910 is loaded by driving the in-situ pipe carrier 900 through the center of the pipe section 910 such that the non-motorized piston head roller 926 and the motorized piston head roller 946 are positioned beneath an upper portion of the pipe section 910. The non-motorized piston head roller 926 and the motorized piston head roller 946 are extended such that the pipe section 910 is raised from off of the surface of the recessed trough 922 of cradle 920. After the pipe section 910 is raised above (e.g., "clears") the level of the approach surfaces, the in-situ pipe carrier 900 can be removed from the cradle 920. For example, the in-situ pipe carrier 900 can be removed from the cradle 920 by driving (e.g., and using the nose piston assembly 122 to negotiate steps in uneven surfaces or by placing spacers in the recessed trough 922 beneath the raised pipe section 910) or be hoisted (e.g., directly upwards) from the cradle 920 by a crane.

FIG. 13 is a side view illustrating an in-situ pipe carrier 100 having an extended extension assembly in accordance with embodiments of the present disclosure. In general, the in-situ pipe carrier 1300 includes an extended extension assembly 1350. For example, the extended extension assembly 1350 includes a non-motorized piston head roller 1336. The non-motorized piston head roller 1336 is arranged to lift and carry pipe sections (e.g., 310) in conjunction with at least one of the non-motorized piston head roller 926 and the motorized piston head roller 946. The non-motorized piston head roller 1336 is affixed to the extended extension assembly 1350 and is coextensively included in the pipe-carrying region 190 of the in-situ pipe carrier 1300. Accordingly, increased-capacity energy sources 1354 and an increased-capacity hydraulic reservoir 1356 can be carried within the space made available by selecting the extended extension assembly 1350.

Figure 14:
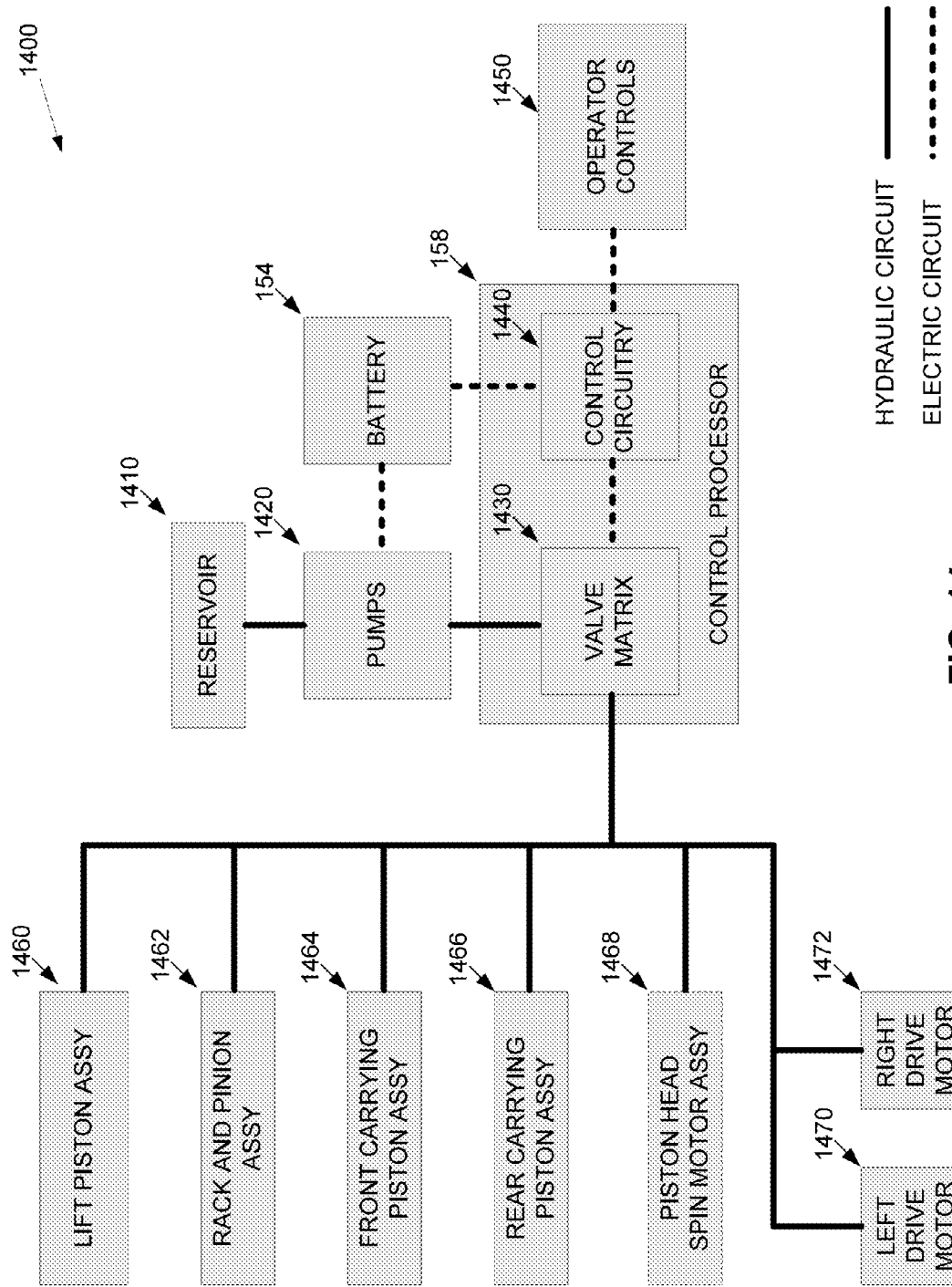
FIG. 14 is a schematic diagram illustrating hydraulic and electrical circuits of the in-situ pipe carrier 100 in accordance with embodiments of the present disclosure.

FIG. 14 is a schematic diagram illustrating hydraulic and electrical circuits of the in-situ pipe carrier 100 in accordance with embodiments of the present disclosure. Generally, system 1400 includes hydraulic and electrical circuits four controlling and operating the in-situ pipe carrier 100. For example, reservoir 1410 is for storing hydraulic fluid use to operate motive and control devices for the in-situ pipe carrier 100. The reservoir 1410 is optionally pressurized by pumps 1420, which in turn are powered by a source of energy 154 to provide pressurized hydraulic fluid to the motive and control devices via a valve matrix 1430. The valve matrix 1430 can be, for example, wholly contained within the control processor 158 (such that the valve matrix 1430 is adjacent to the control circuitry 1440), or distributed such that particular valves are adjacent to each hydraulic device controlled by a particular valve, or combinations thereof. The control circuitry 1440 is coupled to the energy source 154 to provide operating power for controlling the valves of the valve matrix 1430. The control circuitry 1440 is optionally coupled to the operator controls 1450 to provide operating power for the operator controls 1450.

The operator controls 1450 are coupled to the control processor 158 such that, for example, operator commands are conveyed to the control processor 158. The operator controls 1450 can be, for example, contained within an operator station 180 and/or on a remote control surface such that in-situ pipe carrier 100 can be controlled by an operator carried by the in-situ pipe carrier 100 or controlled by an operator remotely (e.g., adjacent to or further from the in-situ pipe carrier 100).

The control processor 158 is configured, for example, to execute instructions for performing tasks specific to the in-situ pipe carrier 100 by actuating valves (e.g., included in the valve matrix 1430). Such tasks include: lifting the front assembly 120 via the left piston assembly (assy) 1460, steering the in-situ pipe carrier 100 via the rack and pinion assembly 1462, lifting a pipe via the rear carrying piston via the front carrying piston assembly 1464 and the rear carrying piston assembly 1466, and driving the in-situ pipe carrier 100 forwards and backwards via the left drive motor 1470 and the right drive motor 1472. A pipe being carried by the in-situ pipe carrier 100 can optionally be rotated about its longitudinal axis by controlling the optional piston head spin motor assembly 1468.

The operator controls are optionally configured to perform "drive-by-wire" operations, which, for example, lighten an operator's workload (which in turn enhances safety in a hazardous environment). For example, an operators command to "lift a pipe section to be carried" is controlled by the control processor 158 responsive to input from sensors 126.

In conjunction with the above disclosure, other types of sensors and equipment can be deployed using a network to provide remote command (e.g., for control) and communications (e.g., for sensing and control) capabilities between remote in-situ pipe carrier 100 operators and the in-situ pipe carrier 100 itself. The network can be a suitable network such as a point-to-point (wired or wireless), cellular, optical, and the like. For example, commands from a remote operator can be transmitted using links via the network to the in-situ pipe carrier 100. The in-situ pipe carrier 100 can communicate, for example, information from its sensors (such as the cameras, pressure, motor current, end, or ground contact switch, and the like) to the remote operator station.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A pipe carrier, comprising:
    a front assembly including a frame-lifting assembly for lifting a front portion of a carrier frame of the carrier, a first traveling support for supporting a portion of the carrier frame while traveling across a first support surface, and a first lifting support for supporting a first portion of a pipe section to be carried by the carrier, wherein the first support surface is a lower portion of an inside surface of an outer pipe, wherein a second support surface is a lower portion of an inside surface of a pipe section arranged within the outer pipe, wherein the frame-lifting assembly is arranged to: lift the front portion the carrier frame of the carrier upward from the second support surface, to travel forwards such that the first traveling support is positioned above the second support surface, and to lower the first traveling support onto the second support surface;
    a rear assembly including a second traveling support for supporting the carrier frame while traveling across the first support surface, and including a second lifting support for supporting a second portion of the pipe section to be carried by the carrier; and
    an extension assembly including an energy source for powering a drive unit of at least one of the front traveling support and the second traveling support, wherein the energy source is carried in a position in the carrier that is at least partially rearwards from the first lifting support and at least partially forwards of the second lifting support, and wherein the energy source is carried within a pipe-carrying region of the pipe section to be carried by the carrier.

2. The pipe carrier of claim 1, wherein the first lifting assembly includes:
an interim traveling support for supporting a portion of the carrier while traveling along the first support surface or the second support surface; and
an extendible arm for placing the interim traveling support on the first or second support surface and for lifting a portion of the pipe carrier upward from the first support surface.

3. The pipe carrier of claim 2, wherein the interim traveling support includes a wheel, wherein the extendible arm includes a piston for extending the interim traveling support, and wherein the piston is arranged to extend along a substantially vertical axis.

4. The pipe carrier of claim 2, wherein the first traveling support is a steerable traveling support.

5. The pipe carrier of claim 2, wherein the energy source is coupled to provide power for powering the first and second lifting supports such that the pipe section to be carried by the carrier is suspended above the first support surface.

6. The pipe carrier of claim 5, wherein the first support surface is a lower portion of an inside surface of an outer pipe, and wherein the pipe section to be carried is a pipe section for placing inside of the outer pipe.

7. The pipe carrier of claim 5, wherein the energy source is coupled to provide power to the second traveling support to cause the carrier frame to travel in a forwards direction such that the interim traveling support of the front lifting assembly is above a second support surface.

8. The pipe carrier of claim 7, wherein the energy source is coupled to provide power for powering the front lifting assembly such that the first traveling support is lifted to a level that is higher than a level of a second support surface.

9. The pipe carrier of claim 8, wherein the second traveling support includes first and second drive wheels wherein the first and second drive wheels are differentially steerable to steer the carrier when the first traveling support is lifted to a level higher than the second support surface, and wherein the first and second drive wheels are differentially steerable by driving each of the drive wheels at different rates.

10. The pipe carrier of claim 2, wherein the extension assembly is bolted to the front assembly and to the rear assembly.

11. The pipe carrier of claim 2, wherein a selected extension assembly is removably affixed to the front assembly and to the rear assembly such that a pipe-carrying region of the carrier is selected to match the length the pipe section to be carried.

12. The pipe carrier of claim 1, wherein the energy source is an electric battery coupled to drive a hydraulic pump coupled to receive hydraulic fluid from a hydraulic fluid reservoir included in the extension assembly.

13. A pipe carrier, comprising:
a frame-lifting assembly for lifting a front portion of the carrier;
a first traveling support for supporting the carrier while traveling across a first support surface, wherein the first traveling support is included in a front portion of the carrier;
a second traveling support for supporting the carrier while traveling across the first support surface, wherein the second traveling support is included in a rear portion of the carrier;
a first lifting support for supporting a pipe section to be carried, wherein the first lifting support is arranged to lift and carry the pipe section to be carried in a pipe-carrying region that is behind the first traveling support and is in front of the second traveling support, wherein the first support surface is a lower portion of an inside surface of an outer pipe, wherein a second support surface is a lower portion of an inside surface of a pipe section arranged within the outer pipe, wherein the frame-lifting assembly is arranged to: lift the front portion the carrier frame of the carrier upward from the second support surface, to travel forwards such that the first traveling support is positioned above the second support surface, and to lower the first traveling support onto the second support surface; and
an extension assembly including an energy source for powering a drive unit of the second traveling support, wherein the energy source is carried in a position in the carrier that is at least partially within the pipe-carrying region.

14. The pipe carrier of claim 13, comprising a second lifting support for supporting the pipe section to be carried, wherein the first lifting support is included in a front portion of the carrier, and wherein the second lifting support is included in a rear portion of the carrier.

15. The pipe carrier of claim 14, comprising a third lifting support for supporting the pipe section to be carried, wherein the third lifting support is included in the extension assembly.

16. The pipe carrier of claim 13, comprising operator controls for controlling the frame-lifting assembly, the first and second traveling supports, and the first lifting support.

17. The pipe carrier of claim 16, wherein the operator controls are remotely operated and are networked to a control processor, wherein the control processor is included in the extension assembly.

18. The pipe carrier of claim 16, wherein the operator controls are included in an operator station bolted to the carrier, wherein the operator station is configured to carry an operator of the carrier.

19. A method, comprising:
affixing a front assembly to an extension assembly, wherein the front assembly includes a first traveling support for supporting the front assembly and the extension assembly while traveling across a first support surface, and wherein at least one of the front assembly and the extension assembly includes a first lifting support for supporting a first portion of a pipe section to be carried;
affixing a rear assembly to the extension assembly, wherein the rear assembly includes a second traveling support for supporting the rear assembly and the extension assembly while traveling across the first support surface, and wherein at least one of the rear assembly and the extension assembly includes a second lifting support for supporting a second portion of a pipe section to be carried, wherein the first support surface is a lower portion of an inside surface of an outer pipe;

coupling power from an energy source included in the extension assembly to at least one of the first and second traveling supports;

coupling power to a frame-lifting assembly to lift a front portion of the front assembly upward from a second support surface, wherein the second support surface is a lower portion of an inside surface of a pipe section arranged within the outer pipe;

coupling power to the frame-lifting assembly to travel forwards such that the first traveling support is positioned above the second support surface;

coupling power to the frame-lifting assembly to lower the first traveling support onto the second support surface.

20. The method of claim 19, comprising coupling power from the energy source to at least one of the first and second lifting support such that the pipe section to be carried is lifted and supported above the first support surface.

* * * * *